(12) United States Patent
Tsuji

(10) Patent No.: US 6,842,270 B2
(45) Date of Patent: Jan. 11, 2005

(54) IMAGE READING DEVICE

(75) Inventor: Junichi Tsuji, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 919 days.

(21) Appl. No.: 09/737,777

(22) Filed: Dec. 18, 2000

(65) Prior Publication Data

US 2001/0004288 A1 Jun. 21, 2001

(30) Foreign Application Priority Data

Dec. 16, 1999 (JP) .......................................... 11-357455

(51) Int. Cl.⁷ ................................................ H04N 1/04
(52) U.S. Cl. ...................... 358/487; 358/486; 358/474; 358/506; 382/318; 382/319; 396/319
(58) Field of Search ................................. 358/487, 506, 358/486, 488, 496, 472, 504, 406; 348/96, 97; 382/319, 318, 312; 355/40, 41, 50; 396/567, 319, 320, 311

(56) References Cited

U.S. PATENT DOCUMENTS

| | | | | |
|---|---|---|---|---|
| 5,600,498 A | * | 2/1997 | Motooka et al. | 360/3 |
| 5,991,010 A | * | 11/1999 | Nishio | 355/82 |
| 6,062,746 A | * | 5/2000 | Stoebe et al. | 396/575 |
| 6,094,217 A | * | 7/2000 | Nishimura | 348/96 |
| 6,094,218 A | * | 7/2000 | Suzuki et al. | 348/96 |
| 6,285,436 B1 | * | 9/2001 | Tsuchihashi et al. | 355/40 |
| 6,373,550 B2 | * | 4/2002 | Tsuchihashi et al. | 355/40 |
| 6,621,602 B1 | * | 9/2003 | Tsuji | 358/487 |
| 6,697,537 B2 | * | 2/2004 | Norimatsu | 382/275 |

* cited by examiner

Primary Examiner—Cheukfan Lee
(74) Attorney, Agent, or Firm—Sughrue Mion, PLLC

(57) ABSTRACT

An image reading device is provided in which processing of magnetic information and image reading can be carried out efficiently, and parts can be arranged highly efficiently in terms of space. By conveying an APS film in a pull-out direction, magnetic information is read by a magnetic head, and an image frame is prescanned by a line CCD. Next, the APS film is conveyed in a take-up direction, and fine scanning is carried out by the line CCD and magnetic information is written by a magnetic head. In this way, because writing of magnetic information can be carried out during conveying for fine scanning, processing time can be shortened. Moreover, because a distance between the magnetic head and the line CCD is not restricted, the magnetic head and the line CCD can be disposed at positions which are efficient in terms of space.

9 Claims, 12 Drawing Sheets

F I G. 7
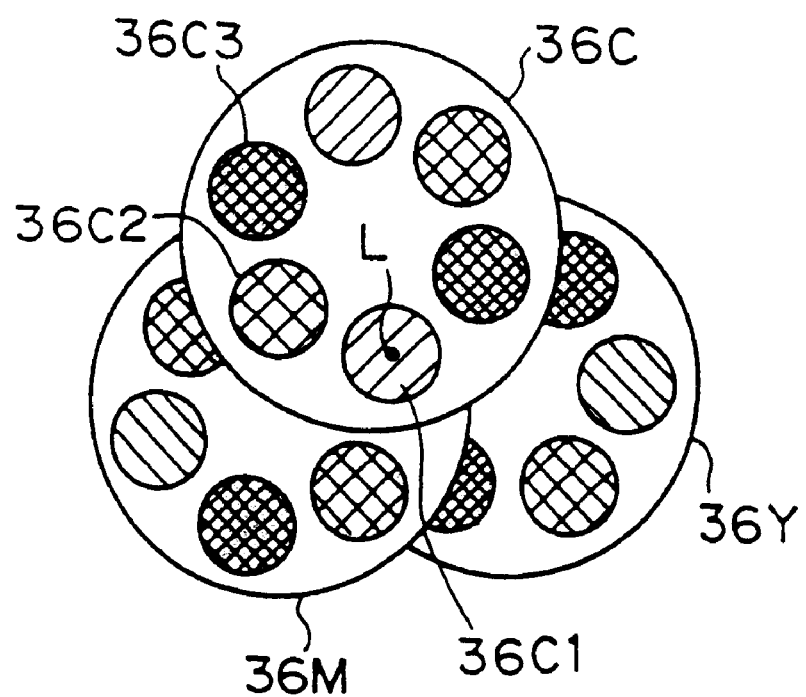

F I G. 9
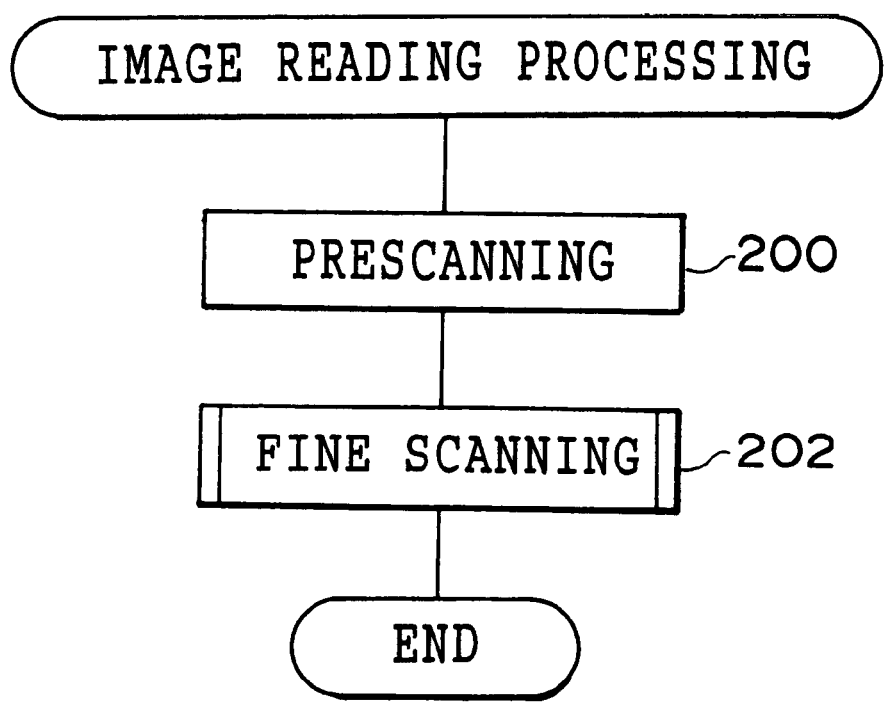

F I G. 1 1
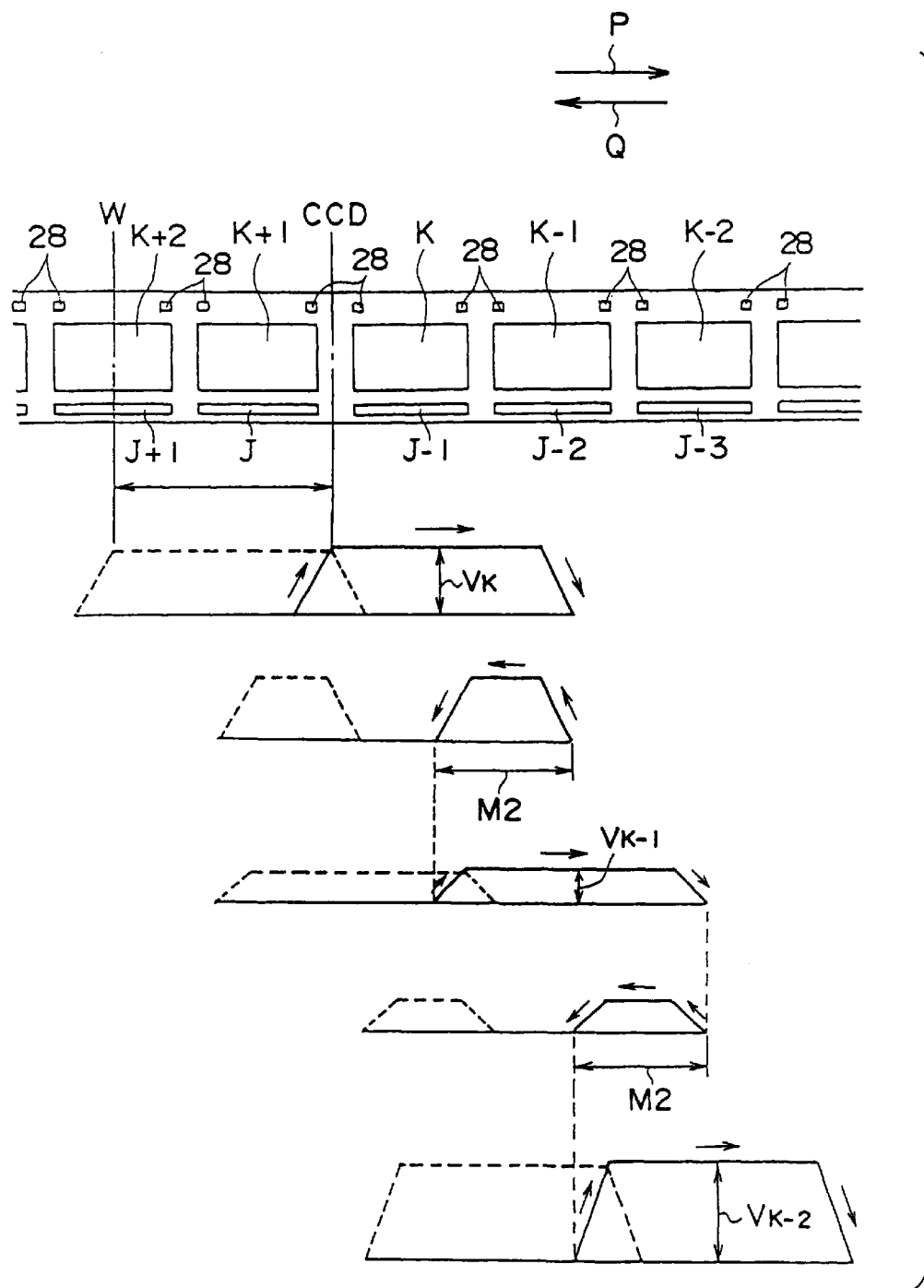

IMAGE READING DEVICE

BACKGROUND OF THE INVENTION

1. Field of the Invention

The present invention relates to an image reading device which, while conveying an elongated image information support on which a plurality of frame images are recorded, reads the frame images by a line scanner.

2. Description of the Related Art

A technique is known in which frame images recorded on an image information support, e.g., a photographic film, are optically read by a reading sensor such as a CCD, image processing such as enlargement/reduction, various types of correction, and the like are carried out on the digital image data obtained by the reading, and an image is formed on a recording material by laser light which is modulated on the basis of the digital image data which has been subjected to image processing.

In this technique of digitally reading an image frame by an area sensor such as a CCD, in order to realize highly accurate image reading, the frame image is preliminarily read (so-called prescanning), reading conditions corresponding to the density or the like of the frame image are determined (e.g., the amount of light to be irradiated onto the frame image, the charge accumulating time of the CCD, and the like), and reading of the frame image is carried out again under the determined reading conditions (so-called fine scanning).

However, in the case of a photographic film provided with a magnetic recording layer (hereinafter referred to as an APS film), in addition to the image reading, additional operations for processing the magnetic information (reading and writing the magnetic information) are carried out. Accordingly, in the series of film processings, the four steps of reading magnetic information from the magnetic recording layer, writing magnetic information onto the magnetic recording layer, prescanning by using the line sensor, and fine scanning by using the line sensor, are carried out.

Here, the reading speed (the APS film conveying speed) of image reading (fine scanning) by the line scanner differs per image frame. On the other hand, from the standpoint of processing efficiency, it is desirable that fine scanning of the respective image frames and writing of magnetic information are carried out simultaneously. Accordingly, a distance, in the conveying direction of the APS film, between the write position of the magnetic information (the position of the writing head) and the image information scanning position (the reading position of the line scanner) is preferably set to be an integer multiple of the image frame pitch of the film.

However, the distance from the final frame of an APS film to the final end of the film is a predetermined length which is based on manufacturers' standards. Accordingly, in a case such as that described above in which the magnetic information writing head and the line scanner are positioned along the APS film conveying path with an interval therebetween which is an integer multiple of the image frame pitch, there is the possibility that the final image frame of the APS film cannot reach the scanning position of the line scanner, and that reading of the image information of the final image frame may not be possible. (Namely, there is the possibility that the final image frame of the APS film may only be able to reach the position of the magnetic information writing head.)

SUMMARY OF THE INVENTION

In view of the aforementioned, an object of the present invention is to provide an image reading device which can reliably and efficiently carry out magnetic information processing and image reading.

A first aspect of the present invention is an image reading device which conveys an elongated image information support, on which a plurality of frame images are recorded and which is provided with a magnetic recording layer on which magnetic information is recorded, and reads image information of the respective image frames, the image reading device comprising: a line scanner which carries out prescanning in which the line scanner preliminarily reads the image information of the respective image frames, and which carries out fine scanning in which the line scanner reads the image information of the respective image frames at reading conditions for the respective image frames which are set on the basis of the image information for the respective image frames obtained by the prescanning; a magnetic information reading/writing section which reads the magnetic information of the magnetic recording layer at the time of the prescanning, and writes magnetic information at the time of the fine scanning; and a conveying device which conveys the image information support in a first direction at a constant speed along a conveying path at the time of the prescanning, and which conveys the image information support in a second direction opposite to the first direction along the conveying path at the time of the fine scanning, wherein the line scanner and the magnetic information reading/writing section are disposed along the conveying path at positions which are optimal positions for an arrangement of the line scanner and the magnetic information reading/writing section and parts of the image reading device other than the line scanner and the magnetic information reading/writing section.

The first aspect will be explained hereinafter.

The magnetic information of the respective image frames can be written at the conveying speed for fine scanning which is set for the respective image frames. (The image frame whose magnetic information is being written may be the same as the image frame which is being fine scanned, or may be an image frame other than the image frame which is being fine scanned.) Thus, during conveying in one direction, prescanning and magnetic information reading are carried out, and during conveying in the return (opposite) direction, magnetic information is written while fine scanning is carried out. Accordingly, the above four processes can be carried out in a single round-trip conveying.

Further, because a line scanner is used as the image reading device, there are no great limits on the positional relationship (distance), along the conveying path, between the line scanner and the magnetic information reading/writing section. Accordingly, no matter how this positional relationship is set, magnetic information can be written while image reading is carried out.

Accordingly, the line scanner and the magnetic information reading/writing section can be disposed at positions which are of optimal placement efficiency in consideration of the arrangement of the other parts. Namely, the degrees of freedom in the designing of the image reading device can be maintained. Accordingly, the image reading device can be made compact.

In the prescanning, the image information support is conveyed at a constant speed. Thus, the reading of magnetic information can be carried out simultaneously.

In a second aspect of the present invention, in the image reading device of the first aspect, an interval, at the conveying path, between a writing position of the magnetic information reading/writing section and a reading position of the line scanner is not an integer multiple of an image frame pitch of the image information support.

The second aspect of the present invention will be described hereinafter.

In the conventional art, it was preferable that the interval between the writing position of the magnetic information reading/writing section and the reading position of the line scanner was an integer multiple of the image frame pitch. However, in the second aspect of the present invention, the interval between the writing position of the magnetic information reading/writing section and the reading position of the line scanner does not have to be an integer multiple of the image frame pitch. Thus, the magnetic information reading/writing section and the line scanner can be freely set along the conveying path. Accordingly, the magnetic information reading/writing section and the line scanner can be disposed in accordance with the arrangement of the other parts.

In a third aspect of the present invention, in the image reading device of either the first or second aspect, the magnetic information reading/writing section and the line scanner are disposed in an interval of the conveying path which interval corresponds to an interval from a final end portion of the image information support to a final frame of the image information support when the image information support is pulled out to a maximum extent possible from an accommodating body which accommodates the image information support and is set in the image reading device.

The third aspect of the present invention will be described hereinafter.

The magnetic information reading/writing section and the line scanner are disposed in an interval of the conveying path which interval corresponds to an interval from a final end portion of the image information support to a final frame of the image information support when the image information support is pulled out to a maximum extent possible from an accommodating body which accommodates the image information support and is set in the image reading device. Thus, reading of image information of the final image frame, or writing of magnetic information of the final image frame can be reliably carried out.

In a fourth aspect of the present invention, in the image reading device of the third aspect, a pull-out roller for pulling out the image information support from the accommodating body, and a dirt removing roller for removing dirt are provided in the interval of the conveying path which interval corresponds to the interval from the final end portion of the image information support to the final frame of the image information support.

The fourth aspect of the present invention will now be described.

By providing the pull-out roller and the dirt removing roller in the interval of the conveying path, reading of image information and writing of magnetic information can be carried out reliably.

In the fifth aspect of the present invention, in the image reading device of any of the first through the fourth aspects, for all of the image frames, the conveying device conveys the image information support at a constant speed in the second direction at the time of the fine scanning.

The fifth aspect will be described hereinafter.

In a case in which there are few images (few pixels) to be read (such as in the case of large-sized prints or the like), even if the conveying speed at the time of fine scanning is made constant for all of the image frames, excellent image reading can be carried out without affecting the precision of image reading. Namely, because there is no need to vary the conveying speed for each image frame at the time of fine scanning, the image processing speed can be improved.

In a sixth aspect of the present invention, in the image reading device of any of the first through fourth aspects, at the time of the fine scanning, before the line scanner reads the image information of the respective image frames, the conveying device conveys the image information support in the first direction by a predetermined amount.

The sixth aspect of the present invention will be described hereinafter.

At the time of fine scanning, the image information support is conveyed at a conveying speed which is set differently for each image frame. The image information of each image frame can thereby be read accurately.

When image reading of a given image frame is completed, conveying is stopped temporarily, and then the image information support is accelerated up to a different conveying speed which is set for the next image frame. At this time, because the given image frame is decelerated and stopped, there is the possibility that the leading end of the next image frame cannot be stopped before the reading position of the line scanner and passes thereby (overrunning). Further, even if the leading end of the next image frame can be stopped before the reading position of the line scanner, an approach run interval is needed in order to accelerate the image information support to the conveying speed set for the next image frame. Thus, after reading of each image frame is completed, the image information support is conveyed by a predetermined amount in the opposite direction (the first direction).

In a seventh aspect of the present invention, in the image reading device of the sixth aspect, the predetermined amount is greater than or equal to one image frame pitch.

The seventh aspect will be described hereinafter.

There are cases in which image reading cannot be started simultaneously with the writing of magnetic information, due to the positional relationship between the magnetic information reading/writing section and the line scanner. In these cases as well, if the image information support is conveyed in the opposite direction (the first direction) by at least one image frame pitch, the image information support can be returned to before at least one of the position at which writing of magnetic information starts or the position at which reading of the image frame is possible (including the approach run interval). Accordingly, after the image information support has been conveyed in the first direction by at least one image pitch for each of the image frames, if the image information support is then conveyed in the second direction, the image information support reliably reaches the conveying speed set for each image frame, and thereafter, image reading and magnetic information writing of each image frame can be carried out.

An eighth aspect of the present invention is an image reading device which conveys an elongated image information support, on which a plurality of frame images are recorded and which is provided with a magnetic recording layer on which magnetic information is recorded, and reads image information of the respective image frames, the image reading device comprising: a line scanner which carries out prescanning in which the line scanner preliminarily reads the image information of the respective image frames, and which carries out fine scanning in which the line scanner reads the image information of the respective image frames at reading conditions for the respective image frames which are set on the basis of the image information for the respective image frames obtained by the prescanning; a magnetic information reading/writing section which reads the magnetic information of the magnetic recording layer at the time of the prescanning, and writes magnetic information at the time of the fine scanning; and a conveying device which conveys the image information support in a first direction at a constant speed along a conveying path at the time of the prescanning, and which conveys the image information support in a second direction opposite to the first direction along the conveying path at the time of the fine scanning, wherein an interval, at the conveying path, between a writing position of the magnetic information reading/writing section and a reading position of the line scanner is not an integer multiple of an image frame pitch of the image information support.

A ninth aspect of the present invention is an image reading device which conveys an elongated image information support, on which a plurality of frame images are recorded and which is provided with a magnetic recording layer on which magnetic information is recorded, and reads image information of the respective image frames, the image reading device comprising: a line scanner which carries out prescanning in which the line scanner preliminarily reads the image information of the respective image frames, and which carries out fine scanning in which the line scanner reads the image information of the respective image frames at reading conditions for the respective image frames which are set on the basis of the image information for the respective image frames obtained by the prescanning; a magnetic information reading/writing section which reads the magnetic information of the magnetic recording layer at the time of the prescanning, and writes magnetic information at the time of the fine scanning; and a conveying device which conveys the image information support in a first direction at a constant speed along a conveying path at the time of the prescanning, and which conveys the image information support in a second direction opposite to the first direction along the conveying path at the time of the fine scanning, wherein the magnetic information reading/writing section and the line scanner are disposed in an interval of the conveying path which interval corresponds to an interval from a final end portion of the image information support to a final frame of the image information support when the image information support is pulled out to a maximum extent possible from an accommodating body which accommodates the image information support and is set in the image reading device.

BRIEF DESCRIPTION OF THE DRAWINGS

FIG. 7 is a diagram illustrating a modified example of a turret relating to the embodiments of the present invention.

FIG. 9 is a flowchart illustrating image reading processing in the embodiments of the present invention.

FIG. 11 is a view for explaining a state of conveying an APS film in fine scanning processing relating to a first embodiment of the present invention.

DESCRIPTION OF THE PREFERRED EMBODIMENTS

Embodiments of the present invention will be described in detail hereinafter with reference to the accompanying drawings.

Figure 1:
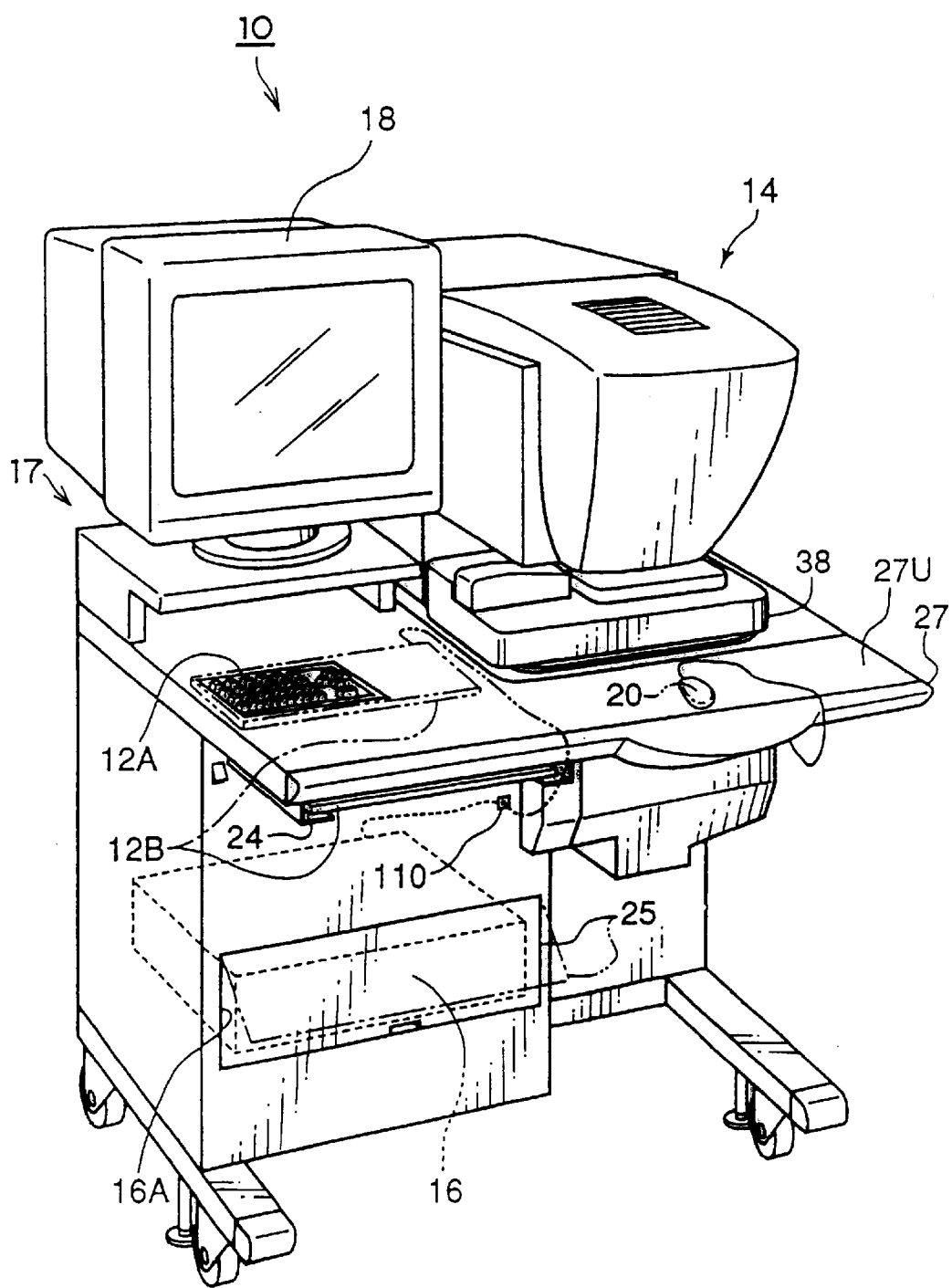
FIG. 1 is an overall perspective view of an image reading device relating to embodiments of the present invention.

As illustrated in FIG. 1, an image reading device 10 relating to the present embodiment is basically formed by a line CCD scanner 14, an image processing section 16, and an operation section 17.

The operation section 17 is formed by a mouse 20, two keyboards 12A, 12B, and a display 18 provided at a work table 27.

One of the keyboards 12A is embedded in a work surface 27U of the work table 27. The other keyboard 12B is stored in a drawer 24 of the work table 27 when not being used, and is removed from the drawer 24 and placed on top of the one keyboard 12A when used. At this time, the cord of the keyboard 12B is connected to a jack 110 connected to the image processing section 16.

The cord of the mouse 20 is connected to the image processing section 16 via a hole 108 (see FIG. 2) formed in the work table 27.

The image processing section 16 is accommodated in an accommodation portion 16A provided at the work table 27, and is closed therein by a door 25. When the door 25 is opened, the image processing section 16 can be removed from the accommodation portion 16A.

The line CCD scanner 14 reads a film image recorded on a photographic film such as a negative film, a reversal film, or the like. For example, the line CCD scanner 14 may read the film image of a 135 size photographic film, a 110 size photographic film, a photographic film on which a transparent magnetic layer is formed (a 240 size photographic film which is known as an APS film), and 120 size and 220 size (brownie size) photographic films. The line CCD scanner 14 reads, by a line CCD 116, the film image which is to be read, and outputs the image data.

The "photographic film" in the present invention is a film in which, after an object has been photographed, developing processing of the film is carried out so that a negative image or a positive image is made visible.

Image data outputted from the line CCD scanner 14 is inputted to the image processing section 16 where image processings such as various types of correction are carried out on the inputted image data, and the processed data is outputted to a laser printer section (not shown) as image data for recording.

Figure 2:
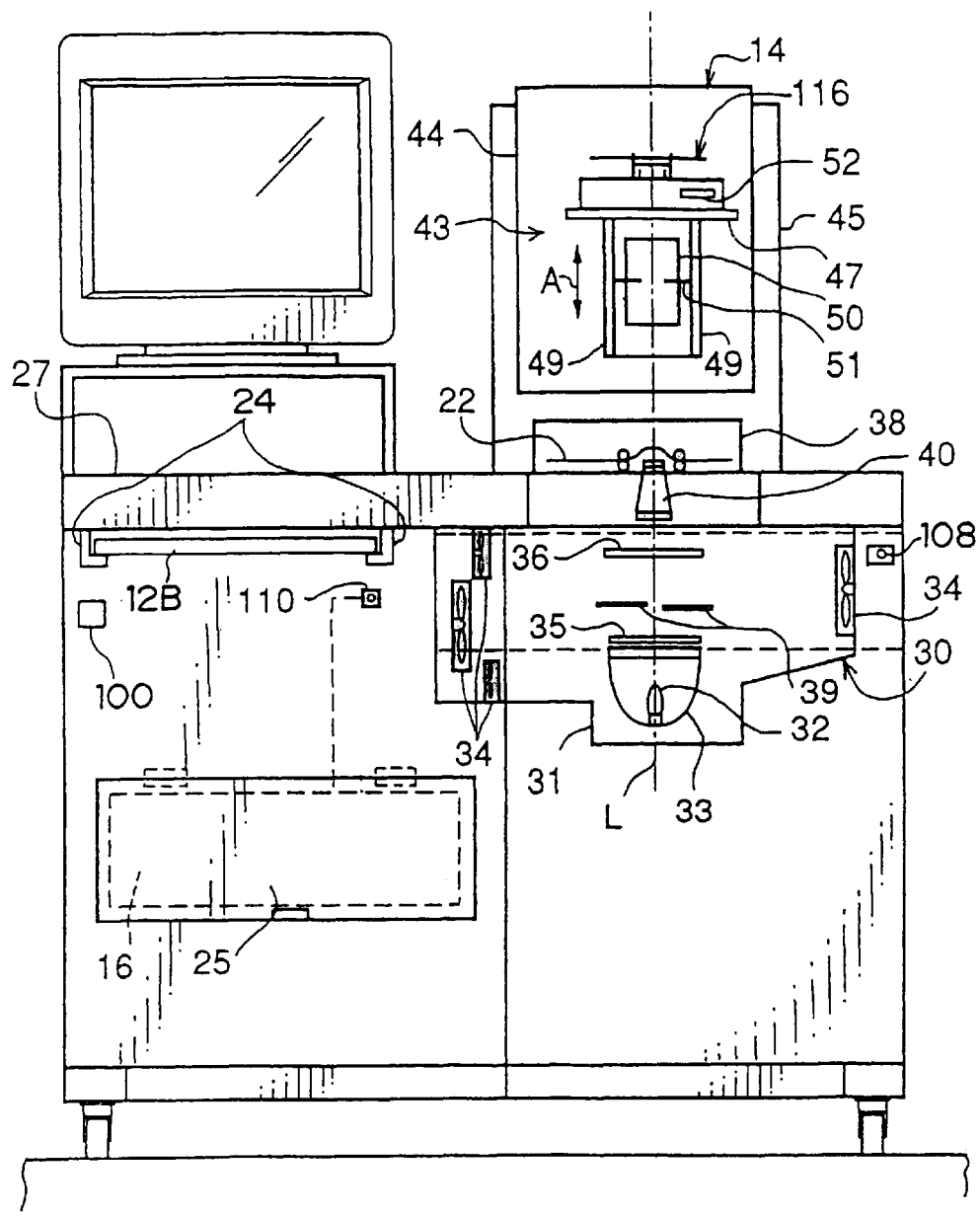
FIG. 2 is a front sectional view of an optical system of the image reading device relating to the embodiments of the present invention.
Figure 3:
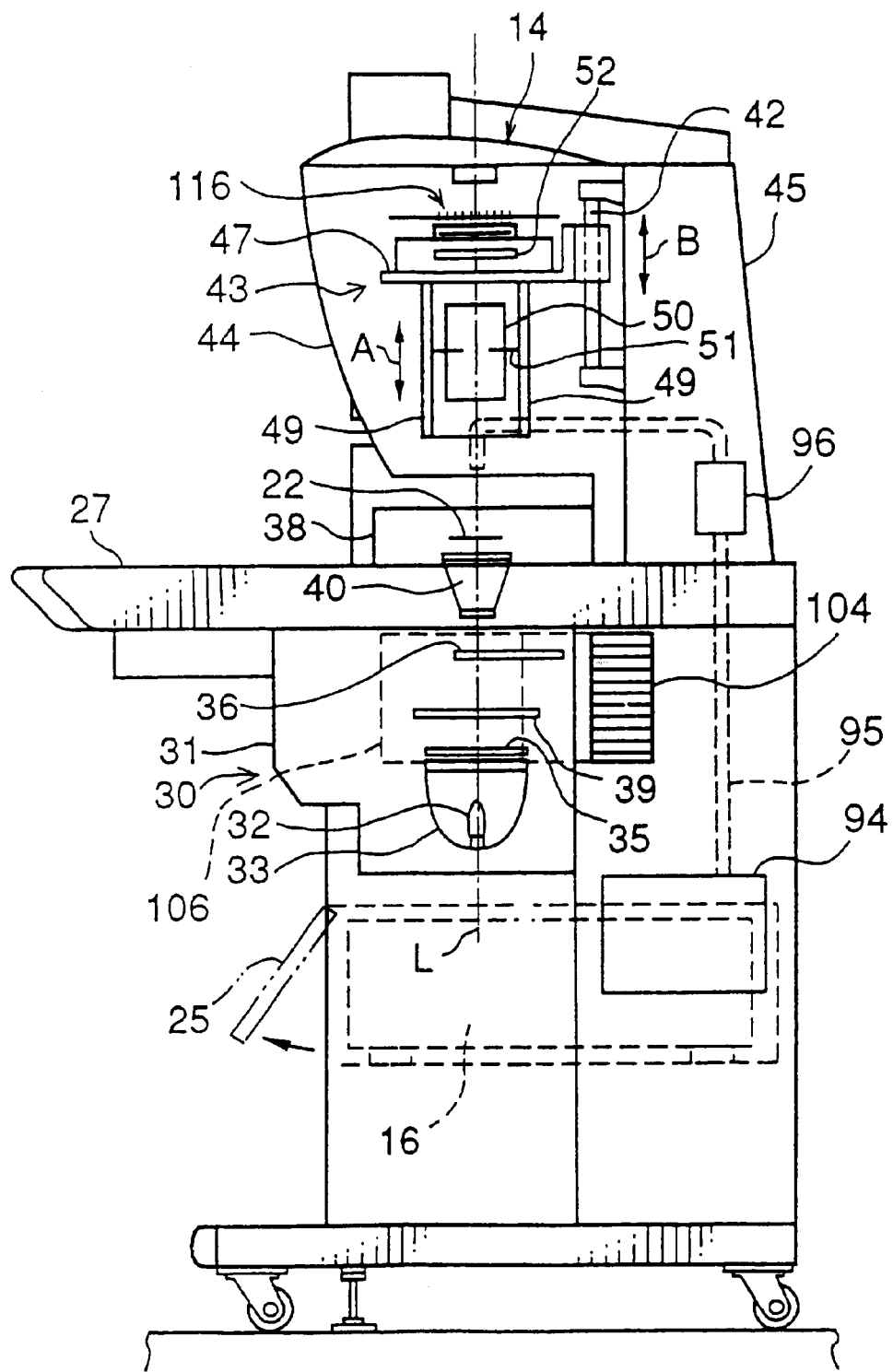
FIG. 3 is a side sectional view of the optical system of the image reading device relating to the embodiments of the present invention.

As shown in FIGS. 2 and 3, the optical system of the line CCD scanner 14 is provided with a halogen lamp section 30 which is disposed below the work table 27, a diffusion box 40 which is supported at the work table 27, a film carrier 38 which is set at the work table 27, and a reading section 43 which is disposed at the side of the work table 27 opposite the side at which the halogen lamp section 30 is disposed.

The halogen lamp section 30 is housed in a metal casing 31. A halogen lamp 32 is disposed within the casing 31. A reflector 33 is provided at the periphery of the halogen lamp 32. A portion of the light emitted from the halogen lamp 32 is reflected by the reflector 33 and is emitted toward the diffusion box 40.

Plural fans 34 are provided at the sides of the reflector 33 (see FIG. 2). The fans 34 are operated while the halogen lamp 32 is lit, so as to prevent the interior of the casing 31 from overheating.

A UV/IR cutting filter 35, a diaphragm 39, and a turret 36 are disposed along the optical axis L of the light emitted from the reflector 33 in that order at the side of the reflector 33 from which light is emitted. By cutting light of wavelengths of ultraviolet and infrared regions, the UV/IR cutting filter 35 improves reading accuracy by preventing an increase in temperature of the photographic film 22. The diaphragm 39 adjusts the amount of the light from the halogen lamp 32 and the amount of light emitted from the reflector 33. A balance filter 36N for negative films and a balance filter 36P for reversal films are fit into the turret 36 (see FIG. 4B). The balance filter 36N and the balance filter 36P appropriately set, in accordance with the type of photographic film (negative film/reversal film), the color components of the light which reaches the photographic film 22 and the reading section 43.

Figure 4A:
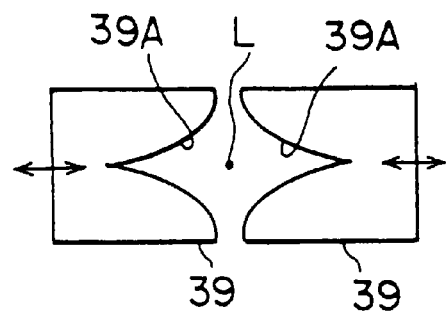
FIG. 4A is a plan view illustrating an example of a diaphragm.
Figure 4B:
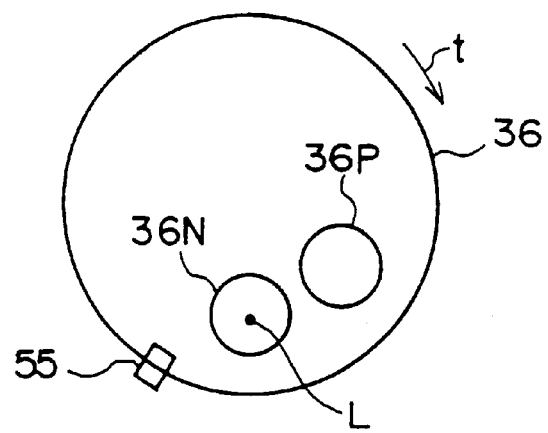
FIG. 4B is a plan view illustrating an example of a turret.

The diaphragm 39 is formed from a pair of plate-like members disposed on either side of the optical axis L and constructed so as to be able to slide both toward and away from each other. As shown in FIG. 4A, a cutout portion 39A is formed in an end section of each of the pair of plate-like members of the diaphragm 39, so that the cross-sectional surface area along a direction perpendicular to the sliding direction changes continuously from one sliding direction end of the plate-like member to the other sliding direction end thereof. The plate-like members are disposed so that the sides in which the cutout portions 39A are formed face each other.

In the above structure, either of the filters (36N, 36P) corresponding to the types of the photographic films is positioned on the optical axis L so as to obtain light of the desired light components. The light amount of the light passing through the diaphragm 39 is adjusted to a desired light amount by the position of the diaphragm 39.

Note that the present invention is not limited to the turret described above (and illustrated in FIG. 4B). As illustrated in FIG. 7, a turret 36C for cyan filters which absorb red light, a turret 36M for magenta filters which absorb green light, and a turret 36Y for yellow filters which absorb blue and violet light may be provided. A plurality of cyan filters 36C1, 36C2, 36C3 having different densities are fit into the turret 36C. Of the three, the cyan filter 36C1 has the lowest density, the cyan filter 36C2 has an intermediate density, and the cyan filter 36C has the highest density. The other turrets 36M, 36Y are structured similarly. The respective turrets 36C, 36M, 36Y are rotatably supported such that the selected filters of the respective turrets overlap on the optical axis L.

The diffusion box 40 is configured such that the length thereof along the subscanning direction decreases toward the top portion of the diffusion box 40, i.e., decreases along the direction of approaching the photographic film 22 (see FIG. 2), and such that the length of the diffusion box 40 along the main scanning direction increases toward the top portion of the diffusion box 40, i.e., increases along the direction of approaching the photographic film 22 (see FIG. 3).

Accordingly, the light which enters into the diffusion box 40 is collected in the subscanning direction by the side surfaces of the diffusion box 40 and made incident on the reading region of the photographic film 22, and is dispersed in the main scanning direction along the reading region. As a result, the amount of light irradiated onto the reading region increases, and high quality image data can be obtained.

Here, the diffusion box 40 is structured such that the length thereof in the main scanning direction increases. However, the diffusion box 40 may be configured such that this length thereof is constant, or such that this length decreases.

The above-described diffusion box 40 is used for a 135 size photographic film. Other diffusion boxes (not shown) of configurations corresponding to other types of photographic films are also readied for use. Further, a light diffusing plate 120 is provided at the light entering side of the diffusion box 40. However, the light diffusing plate 120 may be provided at the light exiting side, or may be provided beneath the film carrier 38.

In the same way as the diffusion box 40, the film carrier 38 is readied for each type of photographic film 22, and is selected in accordance with the type of photographic film 22.

A long, thin opening (not shown), whose length along the transverse direction of the photographic film 22 is wider than the width of the photographic film 22, is provided in each of the top surface and the bottom surface of the film carrier 38 at positions corresponding to the optical axis L. The slit light from the diffusion box 40 is illuminated onto the photographic film 22 via the opening in the bottom surface of the film carrier 38. The light which has passed through the photographic film 22 passes through the opening in the top surface of the film carrier 38 and reaches the reading section 43.

A guide (not shown) which guides the photographic film 22 is provided at the film carrier 38 so as to bend the photographic film 22 at the position at which the slit light is illuminated from the diffusion box 40 (i.e., at the reading position). In this way, the planarity of the photographic film 22 at the reading position can be ensured.

The diffusion box 40 is supported such that the top surface thereof is near the reading position. Thus, a cutout portion is provided in the bottom surface of the film carrier 38 so that the film carrier 38 and the diffusion box 40 do not interfere with each other when the film carrier 38 is loaded.

The film carrier 38 is formed so as to be able to convey the photographic film 22 at various different speeds in accordance with whether prescanning or fine scanning is being carried out, and in accordance with the density of the film image being fine scanned, and the like.

The reading section 43 is accommodated within a casing 44. A placement stand 47, on whose top surface the line CCD 116 is mounted, is provided within the casing 44.

Figure 4C:
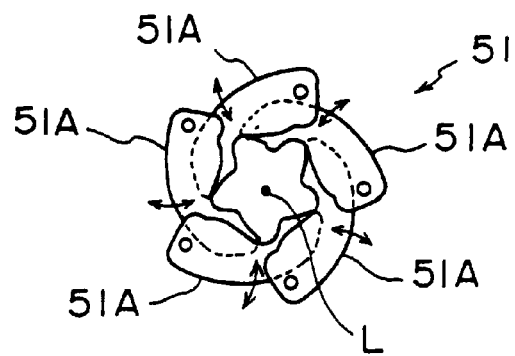
FIG. 4C is a plan view illustrating an example of a lens diaphragm.

Plural supporting rails 49 hang downward from the placement stand 47. A lens unit 50 is supported by the supporting rails 49 so as to be slidable in the directions of arrow A so as to approach and move away from the work table 27 in order to change the magnification (e.g., reduction, enlargement). A support frame 45 is provided at the work table 27. The placement stand 47 is supported by guide rails 42 which are mounted to the support frame 45, such that the placement stand 47 is slidable in directions of arrow B so as to approach and move away from the work table 27 in order to ensure the conjugate length when the magnification is changed or during autofocusing. The lens unit 50 is formed from plural lenses, and a lens diaphragm 51 is provided between the plural lenses. As shown in FIG. 4C, the lens diaphragm 51 is provided with plural diaphragm plates 51A which are each formed in a substantially C-shaped configuration. The diaphragm plates 51A are disposed uniformly around the optical axis L. At each diaphragm plate 51A, one end portion thereof is supported by a pin such that the diaphragm plate 51A can rotate around the pin. The plurality of diaphragm plates 51A are connected to each other via an unillustrated link, and rotate in the same direction when driving force is transmitted thereto from a lens diaphragm driving motor (which will be described later). As the diaphragm plates 51A rotate, the surface area of the portion which is not cut off from light by the diaphragm plates 51A (the substantially star-shaped portion in FIG. 4C) is changed around the optical axis L such that the amount of light which passes through the lens diaphragm 51 changes.

The line CCD 116 is provided with three parallel and spaced-apart lines of sensing portions. Each sensing portion is provided with an electronic shutter mechanism. In each sensing portion, plural photoelectric conversion elements, such as CCD cells or photodiodes, are provided in a line along the transverse direction of the photographic film 22. A color separating filter of R, G or B is mounted to the light-incident side of each sensing portion. (Namely, the line CCD 116 is a so-called 3-line color CCD.) Further, transmitting portions formed from plural CCD cells are provided in vicinities of each of the sensing portions so as to correspond to the sensing portions. The charge accumulated in each CCD cell of the sensing portions is transmitted in order via the corresponding transmitting portion.

Figure 4D:
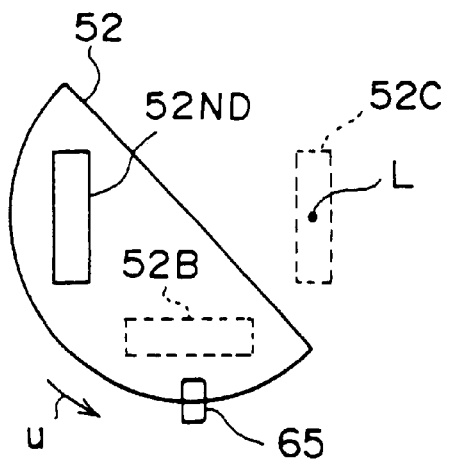
FIG. 4D is a plan view illustrating an example of a CCD shutter.

A CCD shutter 52 is provided at the light-incident side of the line CCD 116. As illustrated in FIG. 4D, an ND filter 52ND is fit into the CCD shutter 52. The CCD shutter 52 rotates in the direction of arrow u to switch to one of a completely closed state (where a portion such as 52B where there is no ND filter 52ND is positioned at a position 52C which includes the optical axis L) for shading light irradiated onto the line CCD 116 for darkness correction, a completely open state (the position shown in FIG. 4D) for allowing light to be irradiated onto the line CCD 116 for ordinary reading or lightness correction, and a light-reducing state (where the ND filter 52ND is positioned at the position 52C) at which the ND filter 52ND reduces the light irradiated onto the line CCD 116 for linearity correction.

As shown in FIG. 3, a compressor 94 for generating cooling air for cooling the photographic film 22 is disposed at the work table 27. The cooling air generated by the compressor 94 is guided and supplied to a reading section (not shown) of the film carrier 38 by a guide tube 95. Consequently, the region of the photographic film 22 positioned at the reading section can be cooled. The guide tube 95 passes through a flow rate sensor 96 which detects the flow rate of the cooling air.

Figure 5:
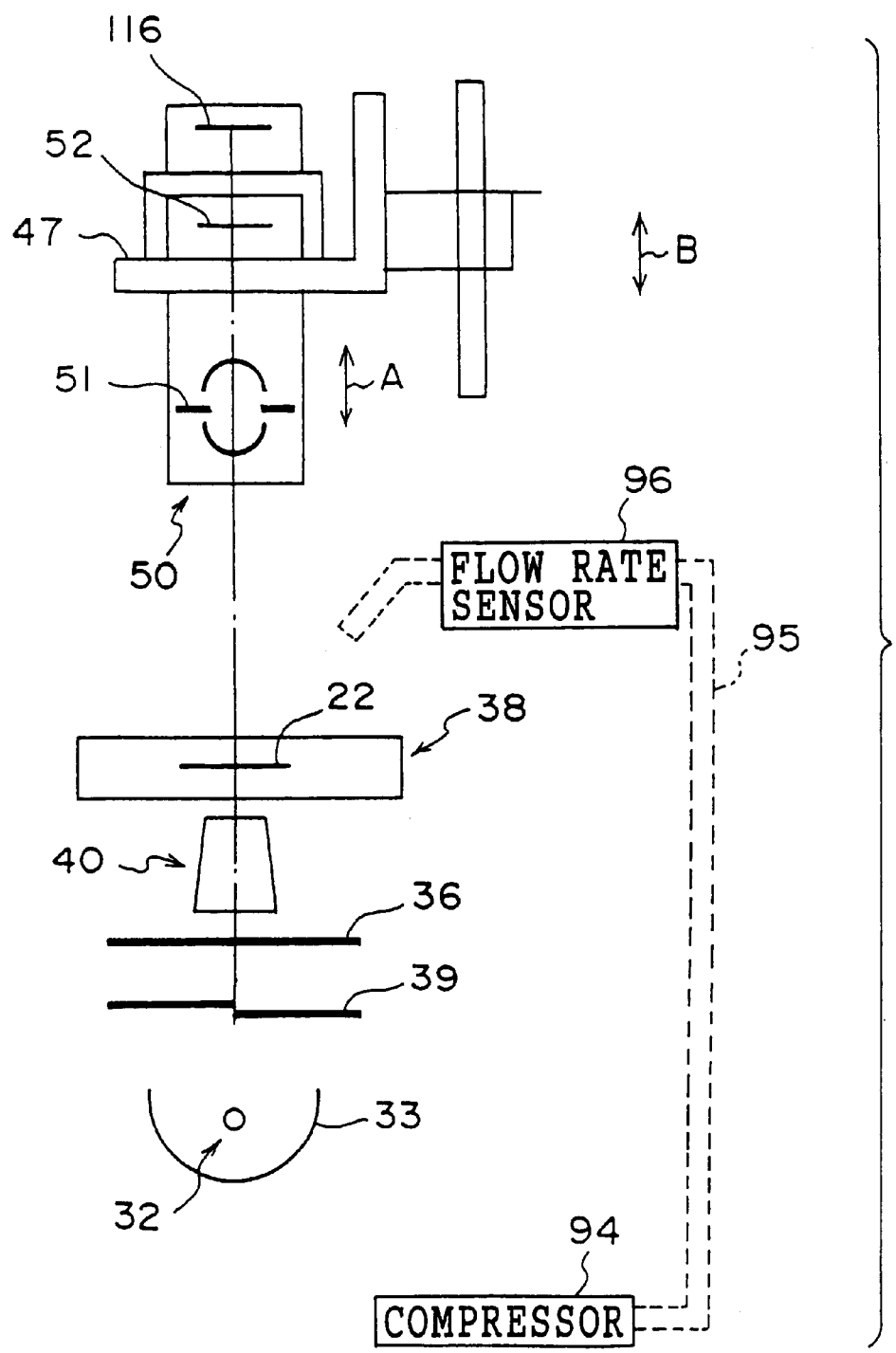
FIG. 5 is a view illustrating only main portions of the optical system of the image reading device relating to the embodiments of the present invention.

The schematic structure of the electrical system of the line CCD scanner 14 and the image processing section 16 will be described hereinafter on the basis of FIG. 6, with reference to FIG. 5 which illustrates the main portions of the optical system of the line CCD scanner 14.

The line CCD scanner 14 has a microprocessor 46 which governs the overall control of the line CCD scanner 14. A RAM 68 (e.g., an SRAM) and a ROM 70 (e.g., a ROM whose stored contents are rewritable) are connected to the microprocessor 46 via a bus 66. A lamp driver 53, the compressor 94, the flow rate sensor 96, and a motor driver 48 are connected to the microprocessor 46. The lamp driver 53 turns the halogen lamp 32 on and off in accordance with instructions from the microprocessor 46. When the film image of the photographic film 22 is being read, the microprocessor 46 operates the compressor 94 to supply cooling air to the photographic film 22. The flow rate of the cooling air is detected by the flow rate sensor 96, and the microprocessor 46 senses abnormalities.

A turret driving motor 54 and a turret position sensor 55 are connected to the motor driver 48. The turret driving motor 54 drives the turret 36 to rotate in the direction of arrow t in FIG. 4B such that one of the balance filter 36N for negative films or the balance filter 36P for reversal films of the turret 36 is positioned on the optical axis L. The turret position sensor 55 (see FIG. 4B as well) detects a reference position of the turret 36 (an unillustrated cutout portion). Also connected to the motor driver 48 are a diaphragm driving motor 56 for sliding the diaphragm 39, a diaphragm position sensor 57 which detects the position of the diaphragm 39, a reading section driving motor 58 which slides the placement stand 47 (i.e., the line CCD 116 and the lens unit 50) along the guide rails 42, a reading section position sensor 59 for detecting the position of the placement stand 47, a lens driving motor 60 which slides the lens unit 50 along the supporting rails 49, a lens position sensor 61 for detecting the position of the lens unit 50, a lens diaphragm driving motor 62 for rotating the diaphragm plates 51A of the lens diaphragm 51, a lens diaphragm position sensor 63 for detecting the position of the lens diaphragm 51 (the position of the diaphragm plates 51A), a shutter driving motor 64 for switching the CCD shutter 52 between the completely closed state, the completely open state, and the light-reducing state, a shutter position sensor 65 for detecting the position of the shutter, and a fan driving motor 37 for driving the fans 34.

When prescanning (preliminary reading) and fine scanning (main reading) are carried out by the line CCD 116, on the basis of the positions of the turret 36 and the diaphragm 39 detected by the turret position sensor 55 and the diaphragm position sensor 57, the microprocessor 46 rotates the turret 36 by the turret driving motor 54 and slides the diaphragm 39 by the diaphragm driving motor 56 so as to adjust the light illuminated onto the film image.

The microprocessor 46 determines the zoom magnification in accordance with the size of the film image, whether trimming is to be carried out, and the like. The microprocessor 46 slides the placement stand 47 by the reading section driving motor 58 on the basis of the position of the placement stand 47 detected by the reading section position sensor 59, so that the film image is read by the line CCD 116 at the determined zoom magnification. Further, the microprocessor 46 slides the lens unit 50 by the lens driving motor 60 on the basis of the position of the lens unit 50 detected by the lens position sensor 61.

When focussing control to make the light-receiving surface of the line CCD 116 coincide with the film image image-forming position by the lens unit 50 is carried out (i.e., when autofocusing control is carried out), the microprocessor 46 slides only the placement stand 47 by the reading section driving motor 58. This focussing control can be carried out such that, for example, the contrast of the film image read by the line CCD 116 is a maximum (what is known as the image contrast method). Alternatively, a distance sensor which measures by infrared rays or the like the distance between the photographic film 22 and the lens unit 50 (or the line CCD 116) may be provided, and focussing control can be carried out on the basis of the distance detected by the distance sensor instead of on the basis of the data of the film image.

A timing generator 74 is connected to the line CCD 116. The timing generator 74 generates various types of timing signals (clock signals) for operating the line CCD 116, A/D converters 82 which will be described later, and the like. The signal output terminals of the line CCD 116 are connected to the A/D converters 82 by amplifiers 76. The signals outputted from the line CCD 116 are amplified by the amplifiers 76 and are converted into digital data at the A/D converters 82.

The output terminals of the A/D converters 82 are connected to the image processing section 16 via correlation double sampling circuits (CDS) 88 and an interface (I/F) circuit 90 in that order. At the CDS 88, feedthrough data which expresses the level of a feedthrough signal and pixel data expressing the level of a pixel signal are respectively sampled, and the feedthrough data is subtracted from the pixel data for each pixel. The CDS 88 successively outputs the results of calculation (pixel data which accurately corresponds to the amount of accumulated charge in each CCD cell) to the image processing section 16 via the I/F circuit 90 as scan image data.

Because the R, G, B photometric signals are outputted in parallel from the line CCD 116, three signal processing systems, each having an amplifier 76, an A/D converter 82, and a CDS 88, are provided. The R, G, B image data which is the scan image data are inputted in parallel from the I/F circuit 90 to the image processing section 16.

The display 18, the keyboards 12A, 12B, the mouse 20 and the film carrier 38 are all connected to the image processing section 16. Accordingly, the image processing section 16 controls the conveying of the photographic film 22 by the film carrier 38. Further, when the image processing section 16 displays a frame image read at the line CCD scanner 14 on the display 18, estimates the image which would be obtained by recording onto photographic printing paper and displays this image on the display 18, and the operator designates correction or the like of the image via the keyboard 12A, such can be reflected in the processing conditions for image processing.

In the present embodiment, at the line CCD scanner 14, reading is carried out twice at respectively different resolutions for each of the frame images. In the first reading which is carried out at a relatively low resolution (hereinafter, prescanning), even in cases in which the density of the frame image is extremely low (e.g., an overexposed negative image on a negative film), reading of the frame image is carried out under reading conditions (the amount of light of each wavelength region of R, G, B light illuminated onto the photographic film, the CCD charge accumulating time) which reading conditions are determined such that saturation of the accumulated charge at the line CCD 116 does not occur. The image data obtained by prescanning (prescan image data) is inputted to the image processing section 16.

In the second reading which is carried out at a relatively high resolution (hereinafter, fine scanning), the frame image is read under reading conditions set on the basis of the prescan image data.

Structure of Film Carrier for APS Film

Figure 8:
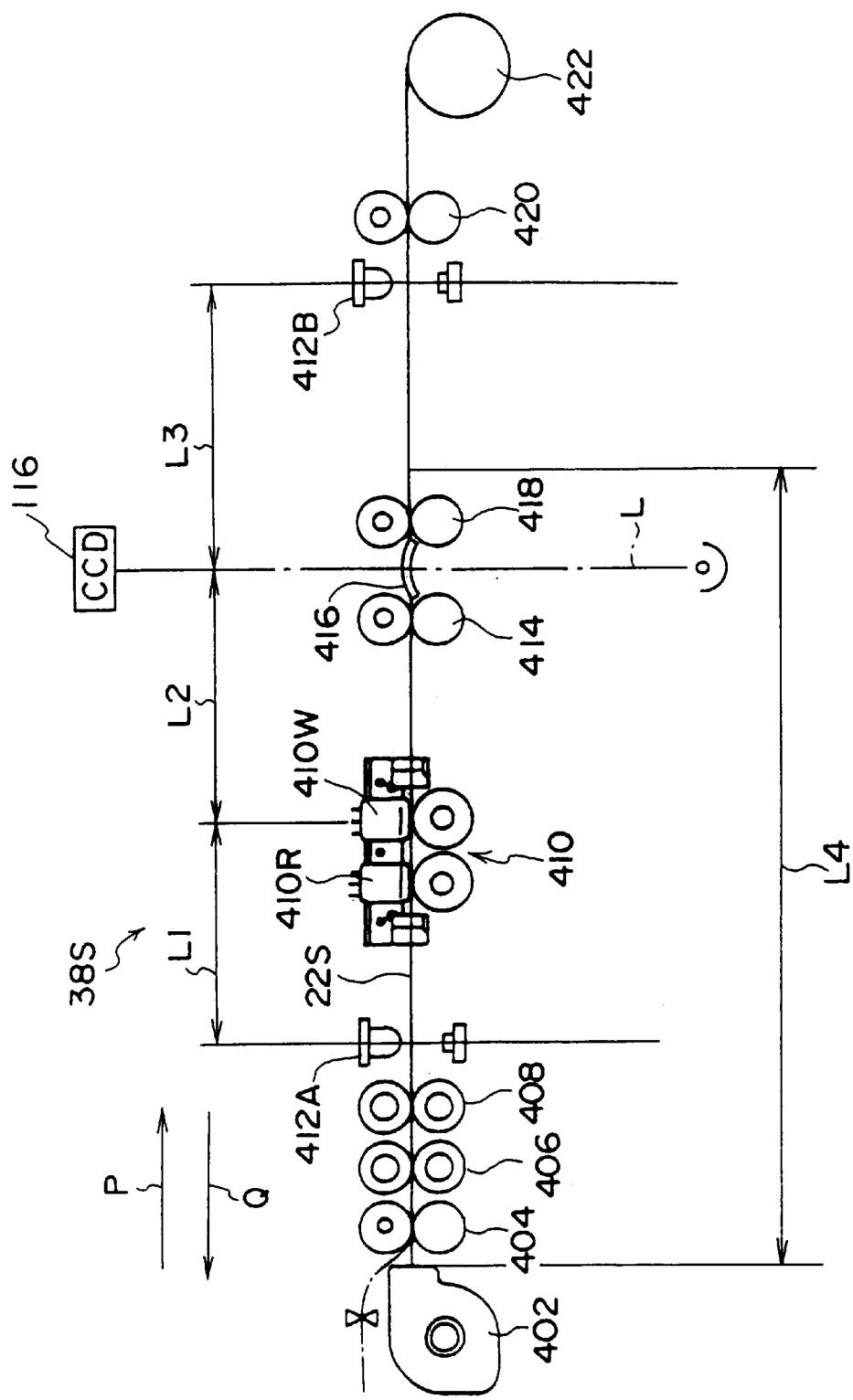
FIG. 8 is a schematic view illustrating a conveying system of a film carrier relating to the embodiments of the present invention.

FIG. 8 is a schematic diagram of a conveying system of a film carrier 38S for an APS film. (The casing of the film carrier 38S is omitted from the drawing.)

A cartridge 402 housing an APS film 22S is set at a predetermined position of the film carrier 38S. Various types of conveying roller pairs and the like which will be described later are disposed along the direction in which the APS film 22S is pulled out from the set cartridge 402. Hereinafter, the direction in which the APS film 22S is pulled out, which direction is denoted by arrow P, is called the pull-out direction. The direction in which the APS film 22S is wound up and accommodated, which direction is denoted by arrow Q, is called the take-up direction.

The following elements are disposed the following order along the pull-out direction (the direction of arrow P) from the predetermined position at which the cartridge 402 is set: a conveying roller pair 404; a dirt removing roller pair 406 for removing dirt, dust debris and the like from the surface of the APS film 22S; a dirt removing roller pair 408 for removing dirt, dust, debris and the like from the surface of a magnetic recording layer formed on the reverse surface of the APS film 22S (a pair of dirt removing rollers 408 is provided at each of the transverse direction end portions of the APS film 22); a perforation sensor 412A which detects perforations 28 of the APS film 22S which perforations 28 are shown in FIG. 11; a magnetic information reading/writing section 410 (a pair thereof, such that one magnetic information reading/writing section 410 is provided at each of the transverse direction end portions of the APS film 22S) provided with a magnetic head 410R (at the upstream side when the film is pulled out) which reads magnetic information from the magnetic track of the APS film 22S and a magnetic head 410W (at the downstream side when the film is pulled out) which writes magnetic information onto the magnetic track; a conveying roller pair 414; a film supporting member 416 for maintaining the relative positions of a read portion of the APS film 22S and an optical system on the optical axis of the APS film 22S at the main scan position of the frame image; a conveying roller pair 418; a perforation sensor 412B for detecting the perforations 28 of the APS film 22S; a conveying roller pair 420; and a temporary take-up section 422 for the APS film 22S.

Among these elements, the conveying roller pairs 404, 414, 418 and 420 are such that the lower side rollers thereof are driving rollers and the upper side rollers thereof are driven rollers.

Here, the conveying roller pair 404, the dirt removing roller pairs 406, 408, the perforation sensor 412A, the magnetic information reading/writing section 410 (the magnetic heads 410R, 410W), the conveying roller pair 414 and the CCD 116 are disposed along an interval of the conveying path which interval corresponds to the distance L4 from the trailing end (the cartridge 402 side end portion) of the final image frame to the cartridge 402 when the APS film 22S is pulled out to the maximum extent from the cartridge 402. In this way, when the scanning position of the CCD 116 is not disposed within this interval, the image information of the final image frame of the APS film 22S cannot be read.

At least one motor (not shown) which is the driving source of the conveying roller pairs 404, 414, 418, 420 is provided at the film carrier 38S. The driving shaft of the motor and the driving shafts of the conveying roller pairs 404, 414, 418, 420 are connected by a multi-step speed change mechanism (not illustrated) which includes pulleys having various different diameters and endless belts and the like. By varying the rotational speeds of the driving shafts of the conveying roller pairs 404, 414, 418, 420 by the multistep speed change mechanism, the conveying speed of the APS film 22S can be changed.

A substantially central portion between the conveying roller pairs 414, 418 is the scanning position at which the APS film 22S is scanned by the line CCD 116. Slit shaped holes for scanning are formed in the casing (not shown) of the film carrier 38S directly above and directly below in the scanning position as well as at the film supporting member 416. Namely, as illustrated in FIG. 3, at the scanning position, scanning light is irradiated from beneath onto the APS film 22S which is conveyed within the film carrier 38S. The light which has passed through the APS film 22S reaches the line CCD 116 which is provided above the film carrier 38S. Although not shown in the drawings, a film feed mechanism is also provided within the film carrier 38S. When the cartridge 402 is set at the position shown in FIG. 8, the film feed mechanism pulls out the leading end portion of the APS film 22S from the cartridge 402 and automatically feeds it to the nip portion of the conveying roller pair 404.

Figure 6:
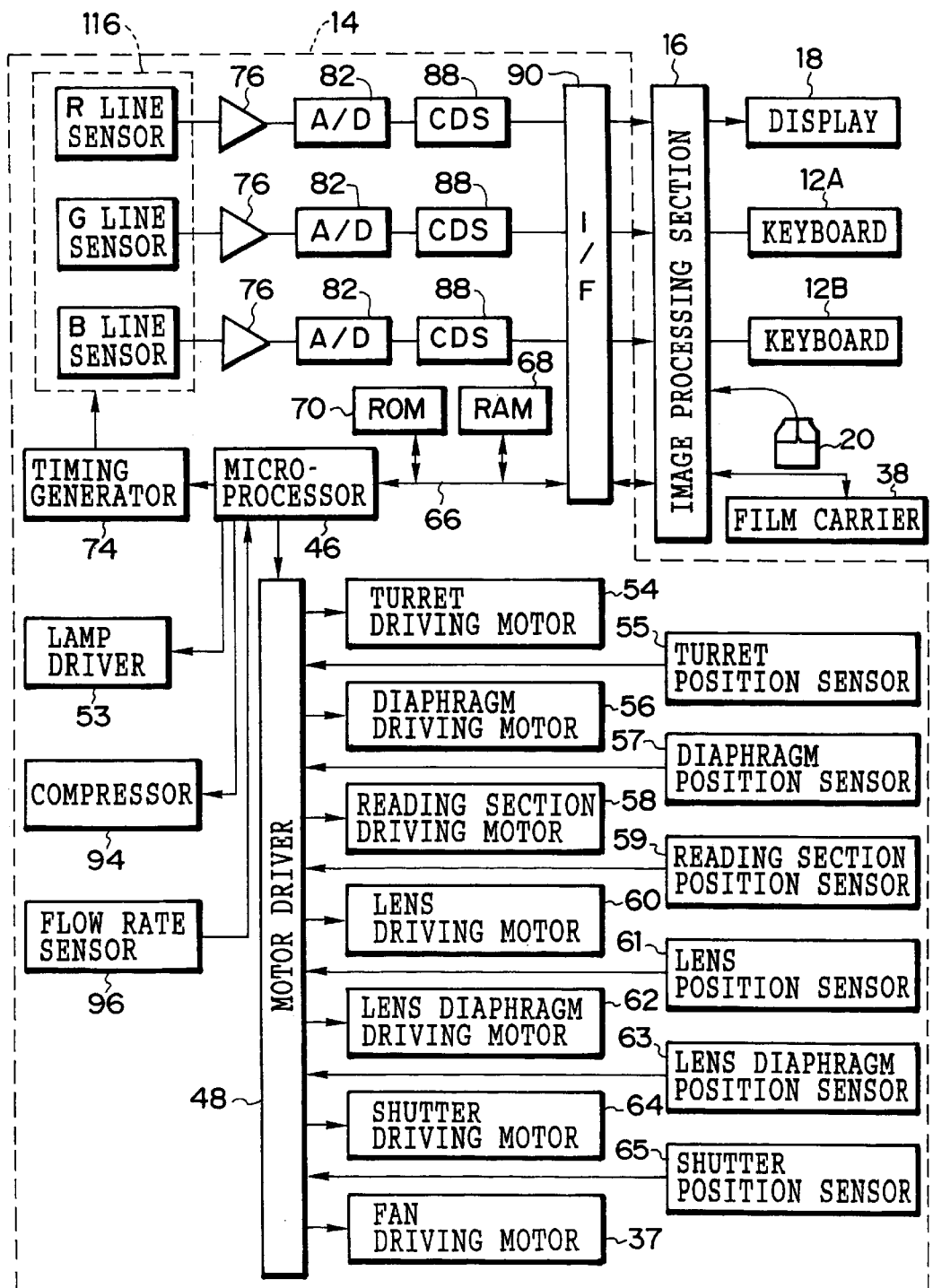
FIG. 6 is a block diagram illustrating a schematic structure of the optical system of the image reading device relating to the embodiments of the present invention.

The timing for the operation of the film pull-out mechanism, the driving of the motor, the magnetic information reading and writing of the magnetic information reading/writing section 410 and the like are controlled by the image processing section 16 illustrated in FIG. 6. Two control programs are stored in the image processing section 16: a conveying control for reading the magnetic information and carrying out prescanning when the film is pulled out; and a conveying control for writing magnetic information and carrying out fine scanning when the film is taken up.

In the film carrier 38S, not only can the APS film 22S stored in the cartridge 402 be inserted into the nip portion of the conveying roller pair 404, but also, a strip film pulled out from a cartridge can be inserted into the nip portion of the conveying roller pair 404 as shown by the imaginary line in FIG. 8, and can be conveyed along the same path as that described above.

A distance L1 between the perforation sensor 412A and the magnetic head 410W, a distance L2 between the magnetic head 410W and scanning position of the line CCD 116 (for scanning the APS film 22S), and a distance L3 between the scanning position and the perforation sensor 412B are respectively set to 0.5 times, 1.5 times and 1.0 times the leading end side perforation pitch between the perforations positioned at the left and the right of one image frame. (Hereinafter, this pitch will be referred to as the image frame pitch.) Here, the leading end side perforations and the trailing end side perforations mean, in FIG. 11, the perforations at the left side and the right side of each image frame, and the image frame pitch refers to the distance between the leading end side perforations of adjacent image frames.

As a result, when the APS film 22S is conveyed in the take-up direction (the direction of arrow Q), when the perforation sensor 412A or the perforation sensor 412B detects the perforations 28 at the leading end side of an image frame, the leading end portion of an image frame which is two frames after this image frame or one frame ahead of this image frame has reached the reading position of the line CCD 116.

Film Conveying Control

Operation of the present embodiment will be described hereinafter in accordance with the flowchart of FIG. 9.

As an example, frame images of 40 frames are recorded on the APS film 22S. The initial frame when the APS film 22S is pulled out from the cartridge 402 is the first frame, and the frames thereafter on the APS film 22S are the second frame, the third frame, . . . the fortieth frame.

In the following description, reading of magnetic information refers to the reading of magnetic information such as whether or not a flash was used at the time of photographing, the date that photographing was carried out, the shutter speed, the exposure amount, and the like. Prescanning of the frame images refers to a preliminary scanning in which the images are read with a relatively rough reading accuracy, and thereafter, set values (reading conditions) for fine scanning are determined. Fine scanning refers to image reading at a high accuracy for final recording. Writing of magnetic information refers to the writing of magnetic information representing, for example, image processing conditions for the respective frame images which are determined by the reading conditions.

Figure 10:
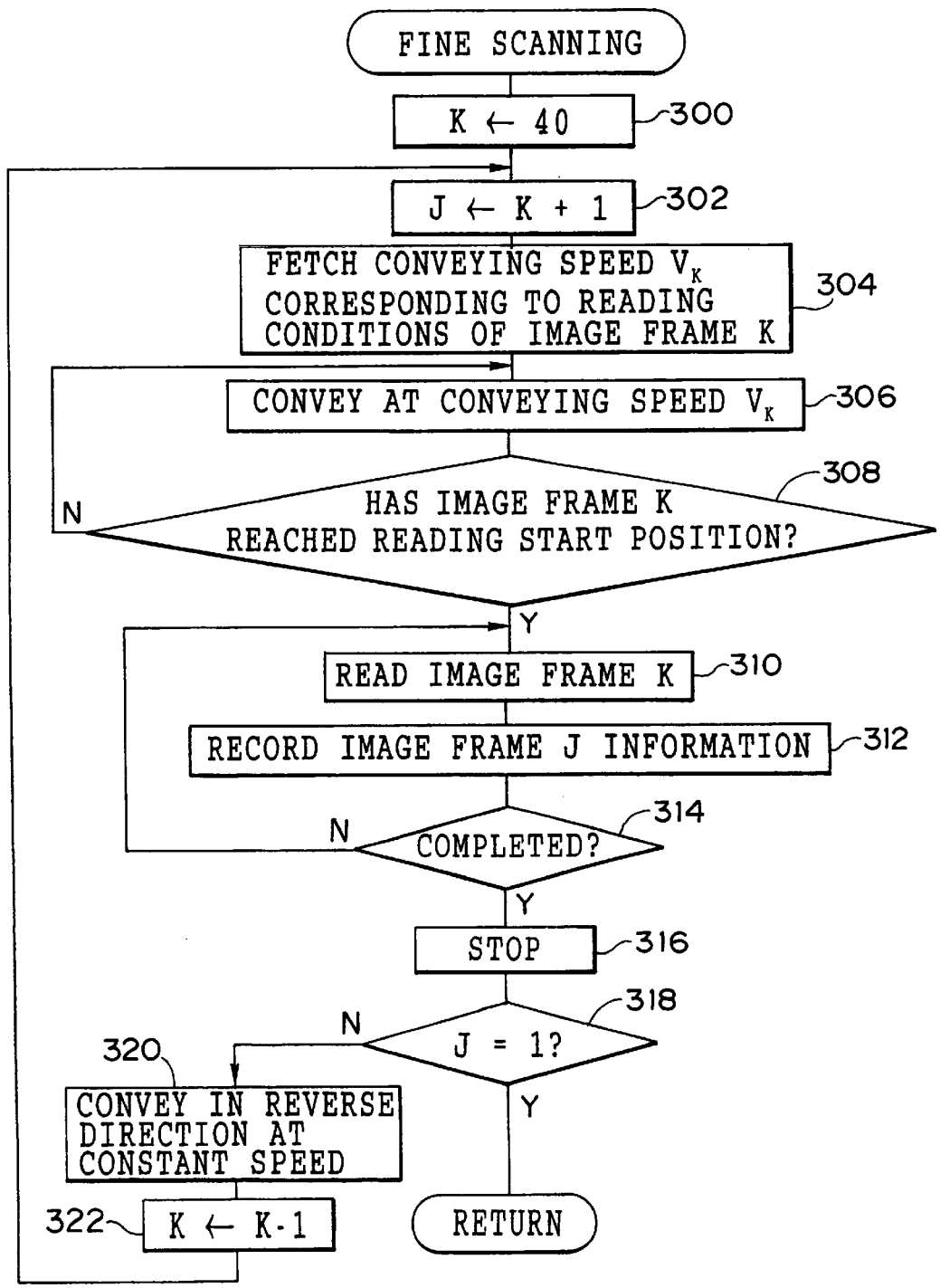
FIG. 10 is a flowchart illustrating fine scanning processing relating to the embodiments of the present invention.

When the operator sets the cartridge 402 at a predetermined position of the film carrier 38S and instructs the start of frame image reading by using the keyboard 12B, the processing routines of the control processings of FIGS. 9 and 10 begin to be executed by the image processing section 16.

The film conveying control will be described hereinafter with reference to the flowcharts in FIGS. 9 and 10 and the schematic diagram of FIG. 11. Note that although the magnetic recording layer is provided at the reverse surface of the APS film 22S, for convenience of explanation, in FIG. 11, only the magnetic recording layer at one side portion is referred to.

At the film carrier 38, the APS film 22S is pulled out from the cartridge 402 by the film feed-out mechanism (not shown), and is conveyed in the pull-out direction (in the direction of arrow P) by the conveying roller pair 404. When the leading end of the APS film 22S is detected by the perforation sensor 412, thereafter, the APS film 22S is conveyed at a constant speed, and the magnetic information corresponding to the respective image frames of the APS film 22S is read by the magnetic head 410R of the magnetic information reading/writing section 410, such that prescanning is carried out at the scan position by the line CCD 116.

At the time of image reading, the APS film 22S is held by the film supporting member 416. Thus, the surface of the APS film 22S does not go slack or vibrate, and appropriate prescanning is carried out. After the APS film 22S passes through the conveying roller pair 420, it is taken up by a temporary take-up section 422.

Because a high level of reading precision is not required during prescanning, the APS film 22S can be conveyed at a constant speed. Further, reading of the magnetic information can be carried out at a constant speed.

At this time, on the basis of the results of prescanning of the respective frame images, the reading conditions and the image processing conditions are computed and set for each of the frame images. In this way, prescanning is carried out from the first frame through the fortieth frame for each of the frame images of the photographic film 22. On the basis of the results of prescanning, the reading conditions and image processing conditions for fine scanning are set for each of the frame images.

The magnetic information and prescanning image data are inputted to the image processing section 16 and stored in the RAM 68. When the perforation at the final end of the APS film 22S is detected by the perforation sensor 412B, it is judged that prescanning for all of the image frames is completed. In this way, the conveying, in the pull-out direction, of the APS film 22S is stopped (step 200).

Next, the APS film 22S is conveyed in the take-up direction (the direction of arrow Q) at a conveying speed which is set for each of the image frames on the basis of the prescan image data. Fine scanning is carried out for each of the image frames, and magnetic information is written by the magnetic head 410W of the magnetic information reading/writing section 410 (step 202).

The fine scanning of step 202 will be described in detail hereinafter with reference to FIGS. 10 and 11. In FIG. 11, the state in which the APS film 22S is conveyed in the take-up direction (the direction of arrow Q) at the time of fine scanning is expressed as relative movement in the pull-out direction (the direction of arrow P) of the magnetic head 410W and the line CCD 116 with respect to the APS film 22S. Here, the solid line represents the distance that the line CCD 116 moves relative to the APS film 22S, and the broken line represents the distance that the magnetic head 410W moves relative to the APS film 22S. The vertical direction represents the speed.

First, K is set to 40 (step 300). This is because the number of image frames of the APS film 22S which is to be fine scanned is 40. If the number of image frames of the APS film 22S is different, K is set to a different number.

Next, the number J of areas in which magnetic information is to be written is set to K+1 (step 302). This is due to the following reason. The distance L2 between the magnetic head 410W and the scan position of the line CCD corresponds to 1.5 image frame pitches. Thus, when a given image frame K is undergoing image reading, simultaneously, the image (magnetic) information for the image frame K+1 is being written.

Here, the conveying speed $V_K$ corresponding to the image frame K set in accordance with the reading conditions is fetched (step 304).

In this case, the stopped APS film 22S is accelerated, and is conveyed at the conveyed speed $V_K$ which is set on the basis of the reading conditions (step 306). The perforation 28 at the leading end side of the image frame K−1 is detected by the perforation sensor 412B, or the perforation 28 at the leading end side of the image frame K+2 is detected at the perforation sensor 412A. In this way, it is confirmed that the leading end of the image frame K has reached the scan position of the line CCD 116, and fine scanning is carried out by the line CCD 116 (step 308 and step 310).

On the other hand, the writing of the magnetic information is carried out after the magnetic information area J has reached the position of the magnetic head 410W. Namely, after a predetermined period of time (0.5×L3/conveyign speed $V_K$) has passed from the start of fine scanning for the image frame K, the magnetic information of the image frame J (=K+1) is written in the magnetic recording area J by the magnetic head 410W (step 312). Here, L3 represents one image frame pitch.

After the trailing end side perforation of the image frame K−1 is detected by the perforation sensor 412B, or after the trailing end side perforation of the image frame K+2 is detected by the perforation sensor 412A, by determining whether the predetermined time (0.5×L3/conveyign speed $V_K$) has passed, it is detected whether or not writing of the magnetic information corresponding to the image frame K+1 has been completed (step 314). At the point in time that the trailing end side perforation is detected, fine scanning for the image frame K is already completed.

When the fine scanning of the image frame K by the line CCD 116 and the writing of the magnetic information for the image frame K+1 have been completed, the APS film 22S is stopped at a predetermined deceleration rate (step 316).

Here, a determination is made as to whether J=1, namely, whether the fine scanning of the final image frame has been completed and the writing of the magnetic information corresponding to the final image frame has been completed (step 318).

If the fine scanning and the magnetic information writing have not been completed, the fine scanning and writing of magnetic information are repeated. In this case, the leading end of the next image frame K−1 of the APS film 22S reaches (passes over) the scan position of the line CCD 116 by the writing of the magnetic information. Accordingly, the APS film 22S is conveyed in the reverse direction by a predetermined distance M2 (hereinafter, this distance is called the overrun distance) (steps 318 and 320).

Here, due to the APS film 22S being conveyed in the reverse direction (the direction of arrow P) by the overrun distance M2, the leading end of the image frame K−1 is moved to a predetermined distance (the approach run distance) before the scan position of the line CCD 116. In this way, at the time the APS film 22S being conveyed in the reverse direction is accelerated again in the direction of arrow Q, after the conveying speed of the APS film 22 has become the conveying speed $V_{K-1}$ set in accordance with the reading conditions, the leading end of the image frame K−1 can reach the scan position of the line CCD 116. Accordingly, when the leading end of the next image frame K−1 of the APS film 22S reaches the scan position of the line CCD 116, the APS film 22S has definitely reached the predetermined conveying speed $V_{K-1}$.

Next, K is decremented by 1 (step 322), and steps from step 302 on are repeated. Thereafter, in the same way, the APS film 22S is accelerated until the conveying speed $V_{K-1}$ of the image frame K−1, and fine scanning of the image frame K−1 is carried out from the image reading start position (scan position). Writing of magnetic information corresponding to the image frame K is carried out after a predetermined time (0.5×L3/conveying speed $V_{K-1}$) has passed from the start of fine scanning.

When the fine scanning and writing of magnetic information for all of the image frames has been completed (J=1), the APS film 22S is taken-up onto the cartridge 402.

In accordance with the present embodiment described above, while the APS film 22S is being conveyed one round-trip, a total of the four processings of reading of the magnetic information recorded on the APS film 22S for the frame images and prescanning (both carried out during conveying in one direction (the pulled-out direction)), and fine scanning and the writing of the magnetic information onto the APS film 22S (both carried out during the conveying in the return direction) are completed. Thus, the processing efficiency at the time of carrying out these processings can be improved.

In particular, because image reading is carried out by the line CCD 116, the writing of the magnetic information can be carried out simultaneously at the time of conveying during fine scanning. As compared to a case in which an area CCD is used, the image processing time can be shortened.

Further, the distance L2 between the reading position of the line CCD 116 and the writing position of the magnetic head 410W is 1.5 image frame pitches in the present embodiment. However, the present invention is not limited to this value, and this value can be changed. For example, the start of writing of magnetic information can be delayed by a predetermined time ($\alpha$/conveying speed $V_{K-1}$) in accordance with the distance L2. Note that L2=n×L3+$\alpha$ (wherein n is an integer, and 0<$\alpha$<L3). Further, $\alpha$ can be set to a value other than 0<$\alpha$<L3.

Accordingly, because the distance L2 between the line CCD 116 and the magnetic head 410W can be set freely while taking the positional relationships with the other parts into consideration, for example, the film carrier 38 can be made as compact as possible. Namely, it is possible to dispose the line CCD 116 and the magnetic head 410W at positions which are the most efficient in terms of space.

In particular, the magnetic information reading/writing section 410 (the magnetic heads 410R, 410W) and the CCD 116 are disposed in an interval of the conveying path corresponding to the distance L4 from the cartridge 402 (the final end of the APS film 22S) to the trailing end of the final image frame when the APS film 22S is pulled out to the maximum extent from the cartridge 402. Thus, the image information of the final image frame of the APS film 22S is read, and reading and writing of magnetic information can be carried out reliably. Namely, the magnetic information reading/writing section 410 (the magnetic heads 410R, 410W) and the CCD 116 can be disposed by adjusting the arrangement with the other members (the dirt removing roller pairs 406, 408 and the like) in accordance with the length L4 of the interval.

In the present embodiment, fine scanning is carried out by changing the conveying speed per image frame. However, in a case in which there are few pixels to be read, e.g., in the case of large size prints, fine scanning of all of the image frames can be carried out by conveying the film in the take-up direction at a constant speed without conveying the film in the reverse direction (the pull-out direction, the direction of arrow P) during fine scanning. Accordingly, in this case, because there is no need to convey the photographic film 22S in the reverse direction during the fine scanning, the processing time can be shortened.

Moreover, in the present embodiment, the rewind position (the overrun distance M2) accompanying the overrun is set to a position at which the image reading of the next image frame at a predetermined conveying speed can be started. However, by rewinding the film by a distance of one image frame or more, when the film is accelerated again in the take-up direction (the direction of arrow Q), the film can always be conveyed at a predetermined conveying speed before reaching the fine scan starting position. In this way, even if there is a slight error in the rewound amount, fine scanning can be started after the conveying speed has reached a predetermined speed.

The same holds when writing of the magnetic information is carried out first.

Next, an image reading device relating to a second embodiment of the present invention will be described. Structural elements which are the same as those of the first embodiment are denoted by the same reference numerals, and description thereof is omitted. Note that the only difference between the present second embodiment and the first embodiment is the structure of the photographic film and the conveying control, and thus, explanation will be given only with reference to FIG. 12.

Figure 12:
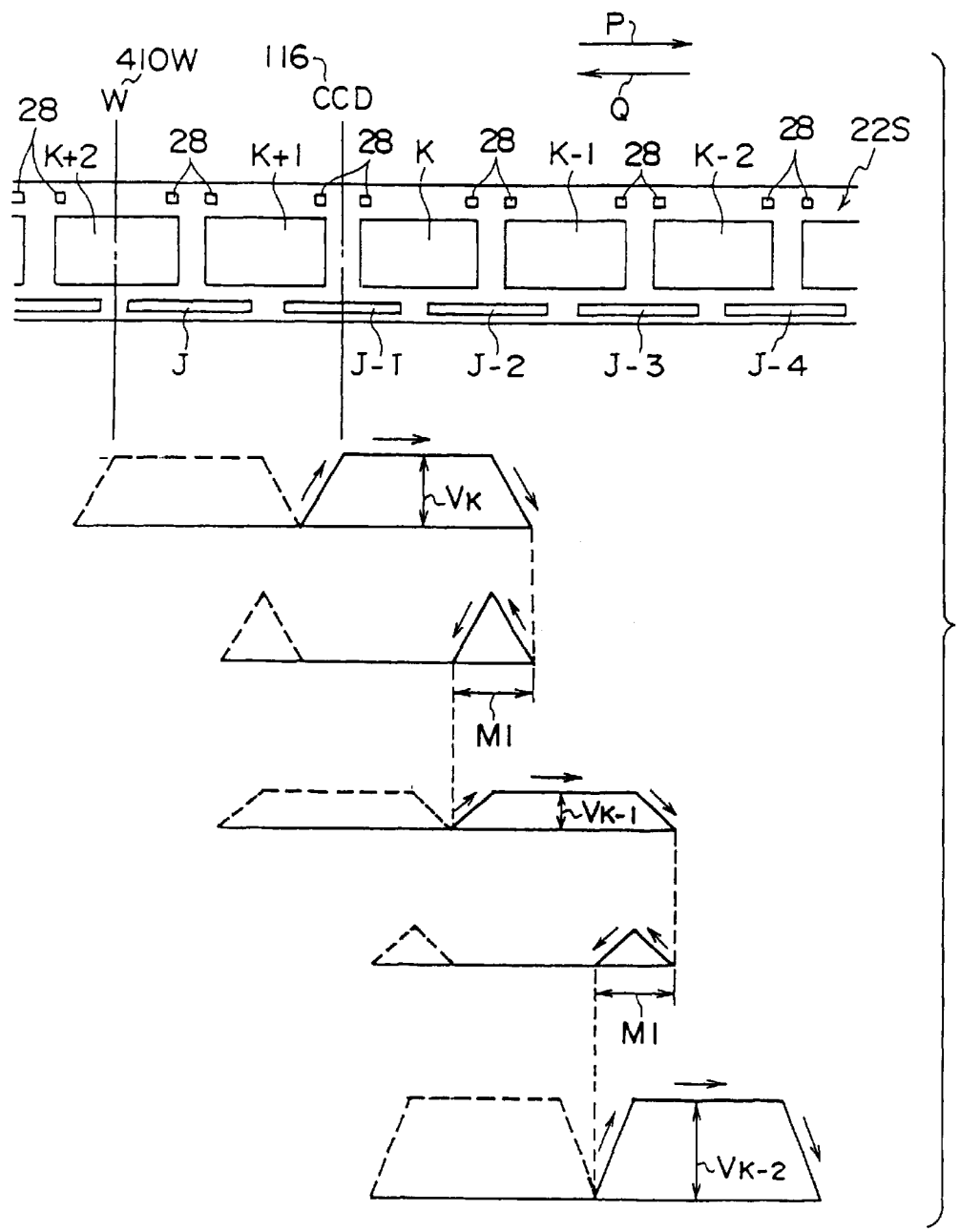
FIG. 12 is a view for explaining a state of conveying an APS film in fine scanning processing relating to a second embodiment of the present invention.

As illustrated in FIG. 12, the magnetic information area J and the image frame K+1 are each set so as to be offset by 0.5 of the image frame pitch. For example, if the distance between the line CCD 116 and the magnetic head 410W is set to 1.5 of the image frame pitch, the fine scanning of the image frame K and the writing of the magnetic information of the image frame K+1 can be started simultaneously. The time required for fine scanning and writing of the magnetic information can be shortened.

Further, because the fine scanning and the writing of magnetic information can be carried out simultaneously, the overrun distance M1 can be shortened, and the rewind time in the pull-out direction can be shortened.

In the present invention described above, because writing of magnetic information is possible during fine scanning, the processing time can be shortened. Further, the positional relationship between the magnetic information reading/writing section and the line scanner can be set freely, and can be arranged efficiently in terms of space. As a result, the degrees of freedom in design are improved, and a compact image reading device can be provided.

What is claimed is:

1. An image reading device which conveys an elongated image information support, on which a plurality of frame images are recorded and which is provided with a magnetic recording layer on which magnetic information is recorded, and reads image information of the respective image frames, the image reading device comprising:

a line scanner which carries out prescanning in which the line scanner preliminarily reads the image information of the respective image frames, and which carries out fine scanning in which the line scanner reads the image information of the respective image frames at reading conditions for the respective image frames which are set on the basis of the image information for the respective image frames obtained by the prescanning;

a magnetic information reading/writing section which reads the magnetic information of the magnetic recording layer at the time of the prescanning, and writes magnetic information at the time of the fine scanning; and a conveying device which conveys the image information support in a first direction at a constant speed along a conveying path at the time of the prescanning, and which conveys the image information support in a second direction opposite to the first direction along the conveying path at the time of the fine scanning, wherein the line scanner and the magnetic information reading/writing section are disposed along the conveying path at positions which are optimal positions for an arrangement of the line scanner and the magnetic information reading/writing section.

2. An image reading device according to claim 1, wherein an interval, at the conveying path, between a writing position of the magnetic information reading/writing section and a reading position of the line scanner is not an integer multiple of an image frame pitch of the image information support.

3. An image reading device according to claim 1, wherein the magnetic information reading/writing section and the line scanner are disposed in an interval of the conveying path which interval corresponds to an interval from a final end portion of the image information support to a final frame of the image information support when the image information support is pulled out to a maximum extent possible from an accommodating body which accommodates the image information support and is set in the image reading device.

4. An image reading device according to claim 3, wherein a pull-out roller for pulling out the image information support from the accommodating body, and a dirt removing roller for removing dirt are provided in the interval of the conveying path which interval corresponds to the interval from the final end portion of the image information support to the final frame of the image information support.

5. An image reading device according to claim 1, wherein for all of the image frames, the conveying device conveys the image information support at a constant speed in the second direction at the time of the fine scanning.

6. An image reading device according to claim 1, wherein, at the time of the fine scanning, before the line scanner reads the image information of the respective image frames, the conveying device conveys the image information support in the first direction by a predetermined amount.

7. An image reading device according to claim 6, wherein the predetermined amount is greater than or equal to one image frame pitch.

8. An image reading device which conveys an elongated image information support, on which a plurality of frame images are recorded and which is provided with a magnetic recording layer on which magnetic information is recorded, and reads image information of the respective image frames, the image reading device comprising:

a line scanner which carries out prescanning in which the line scanner preliminarily reads the image information of the respective image frames, and which carries out fine scanning in which the line scanner reads the image information of the respective image frames at reading conditions for the respective image frames which are set on the basis of the image information for the respective image frames obtained by the prescanning;

a magnetic information reading/writing section which reads the magnetic information of the magnetic recording layer at the time of the prescanning, and writes magnetic information at the time of the fine scanning; and a conveying device which conveys the image information support in a first direction at a constant speed along a conveying path at the time of the prescanning, and which conveys the image information support in a second direction opposite to the first direction along the conveying path at the time of the fine scanning, wherein an interval, at the conveying path, between a writing position of the magnetic information reading/writing section and a reading position of the line scanner is not an integer multiple of an image frame pitch of the image information support.

9. An image reading device which conveys an elongated image information support, on which a plurality of frame images are recorded and which is provided with a magnetic recording layer on which magnetic information is recorded, and reads image information of the respective image frames, the image reading device comprising:

a line scanner which carries out prescanning in which the line scanner preliminarily reads the image information of the respective image frames, and which carries out fine scanning in which the line scanner reads the image information of the respective image frames at reading conditions for the respective image frames which are set on the basis of the image information for the respective image frames obtained by the prescanning;

a magnetic information reading/writing section which reads the magnetic information of the magnetic recording layer at the time of the prescanning, and writes magnetic information at the time of the fine scanning; and a conveying device which conveys the image information support in a first direction at a constant speed along a conveying path at the time of the prescanning, and which conveys the image information support in a second direction opposite to the first direction along the conveying path at the time of the fine scanning, wherein the magnetic information reading/writing section and the line scanner are disposed in an interval of the conveying path which interval corresponds to an interval from a final end portion of the image information support to a final frame of the image information support when the image information support is pulled out to a maximum extent possible from an accommodating body which accommodates the image information support and is set in the image reading device.

* * * * *